May 12, 1959

J. DURST 2,885,938

DISENGAGEABLE AUTOMATIC EXPOSURE DEVICE FOR A PHOTOGRAPHIC SHUTTER

Filed Jan. 10, 1956

INVENTOR.
Julius DURST
BY
Connolly and Hutz

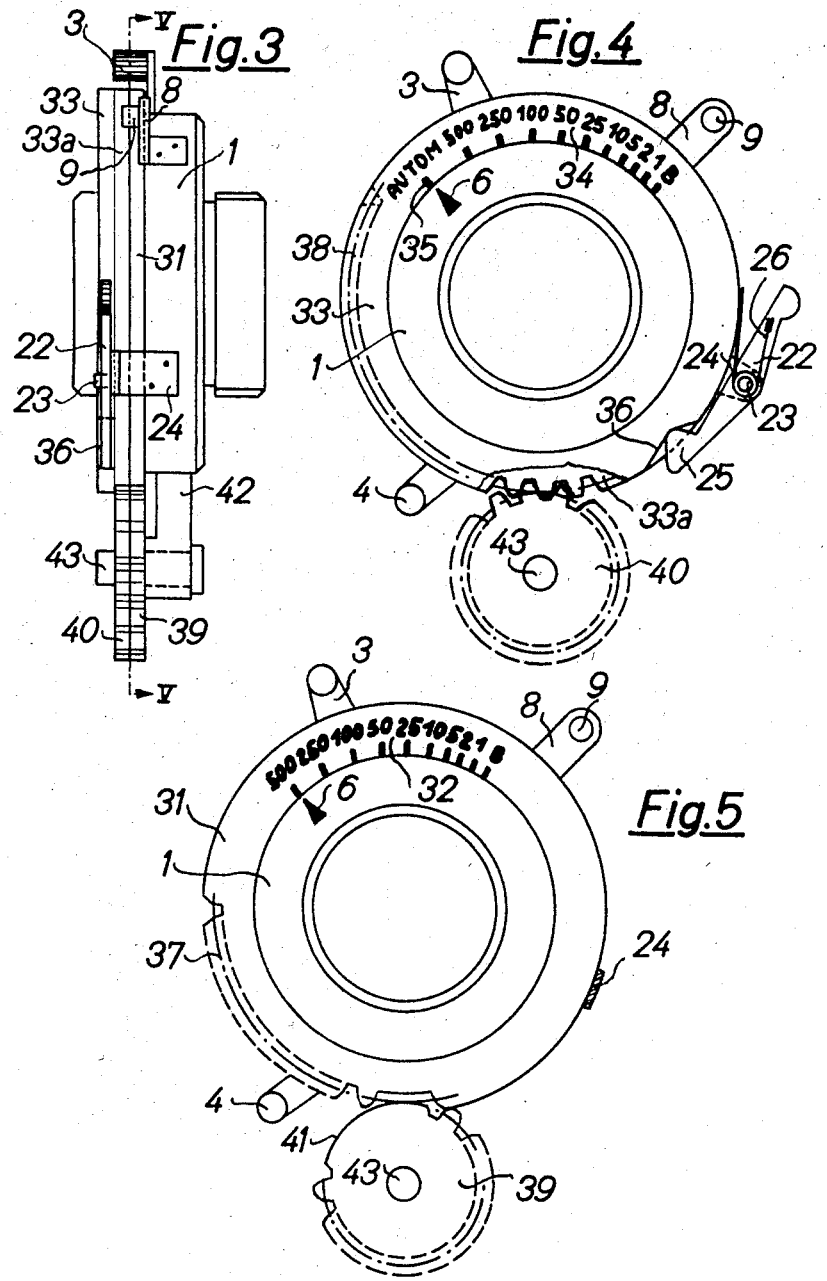

United States Patent Office 2,885,938
Patented May 12, 1959

2,885,938

DISENGAGEABLE AUTOMATIC EXPOSURE DEVICE FOR A PHOTOGRAPHIC SHUTTER

Julius Durst, Bressanone, Italy, assignor to AGFA Aktiengesellschaft

Application January 10, 1956, Serial No. 558,340

Claims priority, application Italy January 22, 1955

17 Claims. (Cl. 95—54)

There are known photographic cameras which include a shutter which can be set by hand to provide various predetermined exposure times, and also include automatic exposure time regulating devices which can be optionally engaged or disengaged from the shutter. The disengagement of the automatic exposure device from the shutter may be required, for example, when photographs are to be taken by flash light.

These existing devices require an additional control element which serves the sole purpose of bringing the automatic shutter control mechanism into operation or of disengaging the same, and these complicate operation of the camera and lead to faulty operation particularly when taking snapshots in a hurry.

To obviate these disadvantages the present invention therefore provides a photographic shutter capable of being manually set to various shutter speeds and incorporating a device for the automatic control of shutter speeds adapted to be optionally brought into engagement with the shutter mechanism or disengaged by the manipulation of a selector means that also serves to set the shutter speed by hand. More particularly two interchangeable shutter retarding mechanisms may be provided which can be interchangeably engaged by movement of a single selector means. For example, one is a manually operable mechanism, and the other incorporates an automatic exposure time regulating device.

In accordance with this invention an additional index mark is applied adjacent to the conventional scale of exposure times. Engagement of the automatic exposure device is accomplished by setting the exposure time selector means on this additional mark. According to the present invention this additional mark is located near the exposure time scale adjacent the mark on the scale that indicates the shortest exposure time.

This invention may also be utilized in conjunction with a shutter having a conventional device which is only used for manually setting the instantaneous exposure times as well as bulb (B) or time (T) adjustments. To this end there is provided, for the purpose of actuating said speed setting device and coupled therewith, a selector means which additionally serves to engage and disengage the automatic exposure time regulating device. A coupling means is provided between the selector means and the speed setting device of the shutter, said coupling means inactivating the automatic exposure device while the selector means is set to provide a predetermined exposure time. The selector means carries an exposure time scale corresponding to the usual exposure time scale on the conventional shutter speed setting device, and also an additional mark for indicating the point at which the automatic exposure device is engaged.

In accordance with this invention the selector includes a cam surface which effects the engaging and disengaging of the automatic exposure time regulating device by contacting a cam follower lever.

The automatic exposure time regulating device in accordance with this invention may be any type of such device, for example a pneumatically operated mechanism or an electronically operated mechanism.

This invention provides the advantage that settings for predetermined exposure times and engagement and disengagement of the automatic exposure time regulating device may be accomplished by manipulation of a single selector means. When the selector means is set upon the mark indicating engagement of the automatic shutter speed regulating device, the mechanical retarding mechanism incorporated in the shutter is rendered inoperative. Faulty settings of the shutter are, therefore, absolutely prevented.

Novel features and advantages of the present invention will become apparent to one skilled in the art from a reading of the following description in conjunction with the accompanying drawings in which:

Fig. 3 is a side view in elevation of another embodiment of this invention;

Fig. 4 is a view in elevation of the embodiment of Fig. 3 seen from the left; and Fig. 5 is a sectional view in elevation taken through Fig. 3 along the line V—V and looking in the direction of the arrows.

Figure 1:
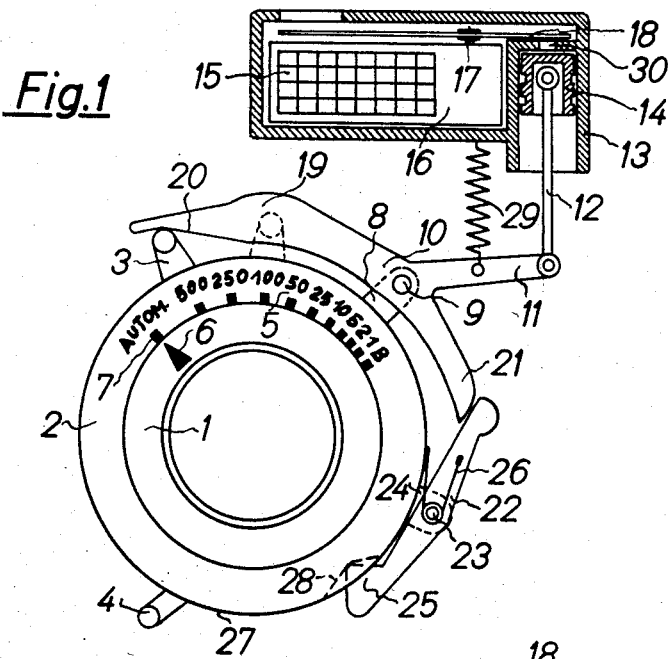
Fig. 1 is a view in elevation partially in cross section of an embodiment of this invention positioned for automatic exposure time operation.
Figure 2:
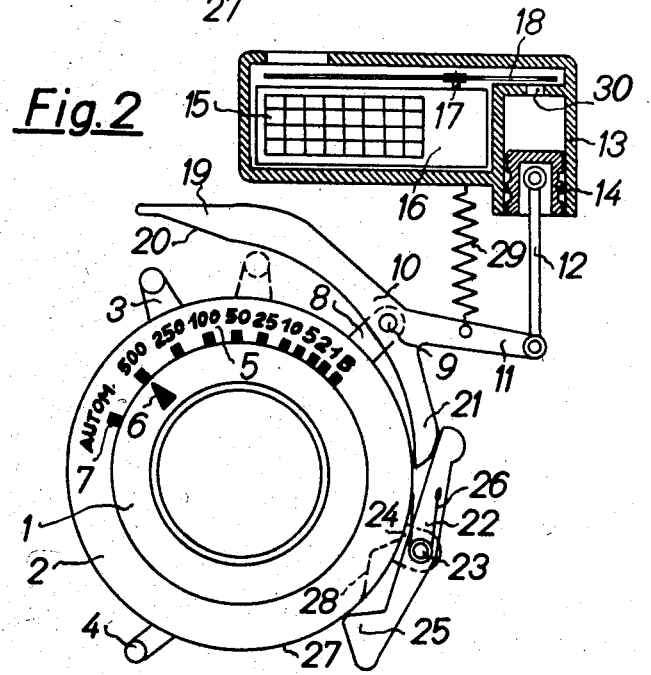
Fig. 2 is a view similar to Fig. 1 positioned with the automatic exposure time regulating device disengaged.

In Figs. 1 and 2, a portion 1 of the housing of a photographic objective lens shutter is shown. An exposure time selector means is provided by a ring 2 which is rotatably mounted upon the housing 1. A shutter cocking lever 3 and a shutter release lever 4, which are parts of a mechanical shutter mechanism of conventional construction, are also mounted upon housing 1. The shutter housing 1 includes a mechanical shutter retarding mechanism of conventional construction (not fully shown) through which a range of predetermined shutter exposure times can be provided. A scale 5 is provided on the exposure time selector ring for manually selecting one of these predetermined shutter exposure times. These predetermined exposure times are obtained by setting the corresponding mark on scale 5 opposite the index mark 6 on the shutter housing 1. A further mark 7 is provided on ring 2 adjacent the mark for the shortest time (1/500 of a second) of scale 5. This additional mark 7 can also be positioned opposite the index mark 6 by movement of the selector ring 2. As is later described in detail, the mark 7 indicates engagement of the automatic exposure regulating device and is, therefore, designated in the drawings by the legend "Autom."

An arm 8 is rigidly mounted on the portion of the shutter housing 1 obscured behind the selector ring 2. A three-pronged lever 10 is rotatably mounted on arm 8 by means of a pin 9. The three-pronged lever 10 includes arms or prongs 11, 19, and 21. Arm 11 of lever 10 is rotatably linked to a piston rod 12 which is part of a pneumatic automatic exposure regulating device. This pneumatic automatic exposure regulating device includes a cylinder 13, a piston 14, a photo sensitive element 15, a galvanometer 16, and a plate 18 connected to rotate with the shaft 17 of the galvanometer 16.

The arm 19 of lever 10 includes a cam surface 20 against which the cocking lever 3 rides, and one arm of a two-armed interlock lever 22 lies within the arc of movement of remaining arm 21 of lever 10. Lever 22 is rotatably mounted by means of a pin 23 on a bracket 24 secured to the housing 1. A hairpin spring 26 is disposed about pin 23 with one end fastened to lever 22 and the other end bearing against the selector ring 2 to press the other arm 25 of lever 22 into forceful engagement with the peripheral surface of selector ring 2. Selector ring 2 includes a depression 28 within which end 25 of lever 22 drops when depression 28 is rotated adjacent end 25.

The operation of the embodiment of the invention shown in Figs. 1 and 2 takes place as described in the following. When the exposure times are to be regulated by the automatic exposure regulating device, the exposure selector ring 2 is set to position the mark 7 opposite the index mark 6. By virtue of this adjustment, the mechanical shutter retarding mechanism within housing 1 (not fully shown) is disconnected from the shutter mechanism. Simultaneously, the cam follower end 25 of interlock lever 22 drops within groove 28 in selector ring 2 which is positioned adjacent end 25 when mark 7 (Autom) is set adjacent index mark 6. The resultant rotation of interlock lever 22 causes its other arm to free the arm 21 of lever 10. The tension spring 29 draws on arm 11 of lever 10 to cause the cam surface 20 of lever 19 to forcefully engage cocking lever 3. This engages the pneumatic automatic exposure regulating device with the shutter operating mechanism. When the cocking lever 3 is moved by hand into the setting position as shown in Fig. 1, the driving spring of the shutter mechanism (not shown) is tensioned and the piston 14 of the pneumatic device is positioned against the top of cylinder 13. After the shutter is released, the cocking lever 3 is moved by the shutter driving mechanism in shutter housing 1 (not fully shown) into the rest position shown in broken line in Figs. 1 and 2. During this movement the cocking lever 3 rides along the cam surface 20 of lever arm 19 to rotate lever 10 in a clockwise direction against the counter-balancing force of tension spring 29 and against the retarding action of the pneumatic device which is connected to arm 11 by means of piston rod 12. The speed of movement of piston 14 is regulated in accordance with the amount of air passing through opening 30 provided in the top of cylinder 13 which is controlled by the position of rotatable plate 18. The position of plate 18 relative to opening 30 is determined by the photoelectric current developed by photo sensitive element 15 under the influence of light detected by said photo sensitive element 15. So the opening 30 is covered by the plate 18 to a greater or lesser extent corresponding to the intensity of light incident upon the photosensitive element 15; and, therefore, the return movement of cocking lever 3 is retarded by the pneumatic exposure time regulating device to a greater or lesser extent corresponding to said intensity of incident light. Longer or shorter shutter opening times are, therefore, provided under the influence of the automatic pneumatic exposure regulating device.

On the other hand when manually selected predetermined exposure times are to be provided, the selector ring 2 is moved in a counter-clockwise direction to position one of the marks included on scale 5 opposite the index mark 6. The lever 22 is also rotated in a counter clockwise direction by rotation of selector ring 2 to raise end 25 of lever 22 out of depression 28. This presses the other arm of lever 22 against arm 21 of lever 10 to rotate lever 10 in a clockwise direction. This raises cam surface 20 of lever arm 19 away from cocking lever 3 (as shown in Fig. 2). The pneumatic automatic exposure regulating device is thereby disengaged from the shutter mechanism. In this condition, the operation of the shutter is regulated in accordance with the manually selected predetermined exposure time and is free of the influence of the pneumatic automatic exposure regulating device.

Figs. 3 to 5 present another form of this invention which is applied to an existing conventional shutter mechanism. Parts shown in Figs. 3–5 identical with those shown in Figs. 1 and 2 are designated by the same reference characters. Referring to Figs. 3–5, included in housing 1 are a conventional shutter operating mechanism and a conventional mechanical shutter retarding mechanism (not fully shown). As shown in Fig. 5, an exposure time adjusting ring 31 is provided including a scale 32 of the type conventionally provided with manually adjustable shutter speed setting rings. Since adjusting ring 31 can only be moved within the angular region determined by the length of scale 32, it cannot be used for engaging or disengaging an automatic exposure regulating device. As shown in Fig. 4, an additional selector ring 33 is mounted on housing 1 in front of adjusting ring 31. Ring 33 includes a scale 34 corresponding to scale 32 on ring 31 and additionally includes a mark 35 for indicating the setting for engaging the automatic exposure time regulating device. At a portion of the periphery of selector ring 33 a cam surface or depression 36 is provided which is contacted by the cam follower end 25 of interlock lever 22 which is rotatably mounted by means of a pin 23 on arm 24 secured to housing 1 as shown in Figs. 1 and 2. This lever 22 activates and deactivates the automatic exposure regulating device, which may be a pneumatic device of the type shown in Figs. 1 and 2. Parts of the mechanism in Fig. 4 identical to parts indicated in Figs. 1 and 2 are omitted to avoid needless repetition.

Adjusting ring 31 and selector ring 33 are respectively coupled to each other by means of toothed segments 37 and 38. To conceal and protect the gear teeth, the toothed segment 38 may be provided on an auxiliary ring 33a disposed behind ring 33, instead of being directly cut in ring 33. The toothed segments 37 and 38 are respectively engaged with pinion gears 39 and 40 which are rigidly connected to each other and rotatably mounted on shaft 43 which is supported in arm 42, which is secured to housing 1. The pinion gear 39 includes a toothless segment 41 cut away to clear the teeth of gear segment 37. Operation of the adjusting ring 31 occurs exclusively by movement of the outer selector ring 33 through the coupling provided by pinion gears 39 and 40. The two rings 33 and 31 are angularly positioned with respect to each other so that the respective scales 34 and 32 lie one behind the other and similar marks on both scales register with the fixed index mark 6 at the same time when the automatic exposure device is disengaged.

When the selector ring 33 is set with the shortest exposure time (1/500 of a second) of scale 34 set opposite the index mark 6, the mechanical retarding mechanism within the shutter housing is already disengaged. At the same time the toothless segment 41 of pinion gear 39 has reached a position adjacent the teeth of segment 37 of ring 31. The adjusting ring 31, therefore, remains at the setting of 1/500 of a second while the selector ring 33 can be further rotated to bring its mark 35 into alignment with the fixed index mark 6. This engages the automatic exposure regulating device by means of interlock lever 22 in a similar manner to that described in Figs. 1 and 2.

Instead of the gear coupling provided by the rings 33 and 31, other forms of overtraveling couplings can be provided. A conventional friction clutch including an elastic connecting member, for example, may be provided for compensating for the difference in paths of movement of rings 31 and 33.

Similarly, instead of pneumatic automatic exposure regulating devices other types of automatic control devices, for example electronically operated devices, may be employed in accordance with this invention.

What is claimed is:

1. A photographic shutter device comprising a moving element incorporated in said shutter, said moving element being characterized in that the exposure time provided by said shutter is a function of the speed of movement of said moving element, an adjustable retarding mechanism operatively associated with said shutter for regulating the speed of movement of said shutter, manually operable selector means operatively associated with said retarding mechanism for setting said retarding mechanism to provide preselected speeds of said shutter, an automatic exposure regulating device, engaging means for optionally coupling said automatic exposure regulating device with said moving element, interlocking means movable between an active position and an inactive position, said interlocking means in said active position, preventing engagement of said automatic exposure regulating device with said moving element and in said inactive position permitting said automatic exposure regulating device to engage said moving element, and said interlocking means being constructed and arranged in view of said shutter speed selector means to be movable from said active position to said inactive position only when said shutter speed selector means assumes a predetermined position.

2. A photographic shutter device as set forth in claim 1, in which said interlocking means is operatively coupled to said shutter speed selector means.

3. A photographic shutter device as set forth in claim 1, in which said interlocking means controls said engaging means.

4. A photographic shutter device as set forth in claim 1 characterized in that two different shutter retarding mechanisms are provided which are adapted to be alternatively engaged with said moving element the shutter by operation of a unitary selector means.

5. A photographic shutter device as set forth in claim 1 wherein said automatic exposure time regulating device is comprised of a pneumatic device including a piston and piston rod and said engaging means for the releasable engagement of said automatic device with said moving element of said shutter is operatively connected to said piston rod.

6. A photographic shutter device comprising a moving element incorporated in said shutter, said moving element being characterized in that the exposure time provided by said shutter is a function of the speed of movement of said moving element, an adjustable retarding mechanism operatively associated with said shutter for regulating the speed of movement of said shutter, manually operable selector means operatively associated with said retarding mechanism for setting said retarding mechanism to provide preselected speeds of said shutter, an automatic exposure regulating device, engaging means for optionally coupling said automatic exposure regulating device with said moving element, interlocking means operatively connecting said selector means with said engaging means, said interlocking means being movable between an active position and an inactive position, said interlocking means in said active position preventing engagement of said automatic exposure regulating device with said moving element and in said inactive position permitting said automatic exposure regulating device to engage said moving element thereby permitting said automatic exposure regulating device to control the speed of movement of said moving element and the exposure time provided by said shutter, and said shutter speed selector means and said interlocking means being constructed and arranged to permit said automatic exposure regulating device to be engaged with said moving element of said shutter when said shutter speed selector means assumes a predetermined position.

7. A photographic shutter device as set forth in claim 6 wherein said predetermined position of said selector means actuates said retarding mechanism to provide the highest preselectable shutter speed obtainable by movement of said selector means.

8. A photographic shutter device as set forth in claim 7 wherein said engaging means is comprised of a three-pronged lever pivoted upon a stationary portion of the housing of said shutter, the first of said prongs including a cam surface disposed adjacent the path of movement of said moving element, the second of said prongs being operatively engaged with said automatic exposure regulating device, the third of said prongs being disposed adjacent the path of movement of said interlocking means, said interlocking means being comprised of a two-armed lever pivoted upon the housing of said camera, the first arm of said lever being constructed and arranged as a cam follower, said selector means including a cam surface, said cam surface and follower being constructed and arranged to remove the second arm of said lever from the path of movement of said third prong when said selector is in said predetermined position to permit said cam surface of said prong to contact said moving element to cause said automatic exposure regulating device to control the speed of movement of said moving element and accordingly control the exposure time provided by said shutter.

9. A device as set forth in claim 8 wherein said moving element of said shutter is comprised of a shutter cocking lever, and said selector means is comprised of a circular element upon whose outer surface said cam is provided.

10. A photographic shutter device as set forth in claim 7, in which said shutter speed selector means is provided with a scale indicating said predetermined shutter speeds, and with an additional mark for indicating the engagement of said exposure regulating device with said shutter moving means.

11. A photographic shutter device as set forth in claim 6, in which said interlocking means includes a cam on said shutter speed selector means and a spring-loaded follower lever cooperating with said cam, said follower lever controlling said engaging means for coupling said engaging means with said moving element in accordance with the position of said cam.

12. A photographic shutter device as set forth in claim 11 wherein said follower lever is disposed in the path of movement of said engaging means.

13. A photographic shutter device as set forth in claim 11 wherein said follower lever and said engaging means are separately pivoted on the shutter housing.

14. A photographic shutter device as set forth in claim 11, in which said additional mark is disposed adjacent said shutter speed scale next to its mark indicating the highest of said predetermined shutter speeds.

15. A photographic shutter device as set forth in claim 6, in which said shutter speed selector means provides a range of settings for setting said retarding mechanism in accordance with said predetermined shutter speeds, and an additional setting is provided for moving said interlocking means to said inactive position.

16. A photographic shutter device as set forth in claim 6, in which said adjustable retarding mechanism is provided with an adjustable member attached thereto, said shutter speed selector means and said adjustable member having different setting ranges and being coupled to one another by overtraveling means so that said shutter speed selector means and said adjustable member are locked together over a common range of settings in accordance with said predetermined shutter speeds, but said shutter speed selector means is movable with respect to said adjustable member in order to control said interlocking means.

17. A photographic shutter device as set forth in claim 16, in which said adjustable member remains set at its position corresponding to the highest of said predetermined shutter speeds when said shutter speed selector means is moved for controlling said interlocking means.

References Cited in the file of this patent

UNITED STATES PATENTS 2,187,953   Schmidt _____ Jan. 23, 1940

FOREIGN PATENTS 516,287   Belgium _____ Jan. 15, 1953